Nov. 9, 1937.　　　C. H. BULLOCK　　　2,098,374
SINK STRAINER BRACKET
Filed Jan. 8, 1936
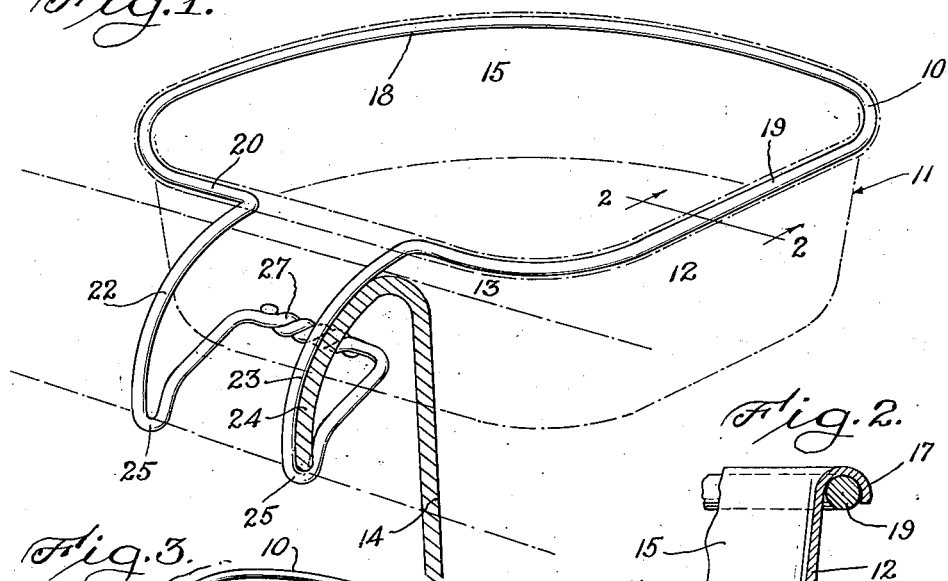
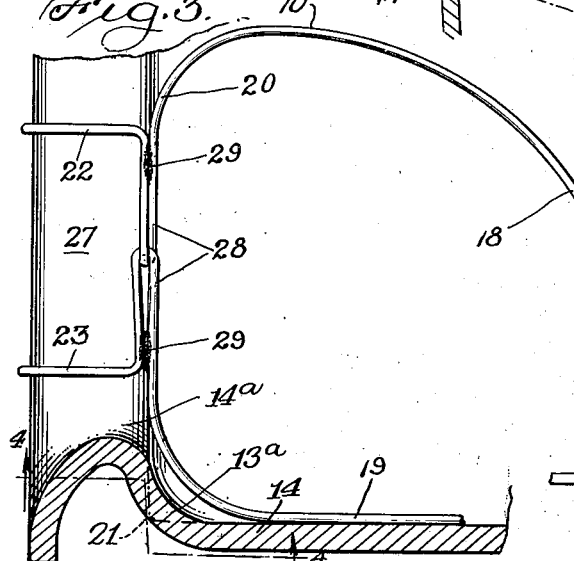
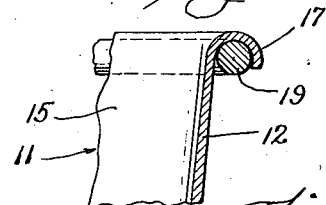
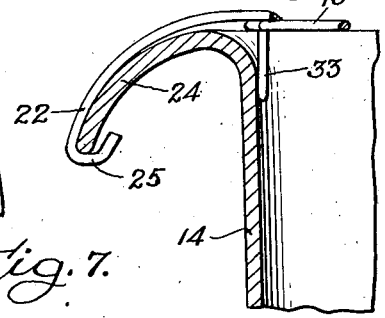
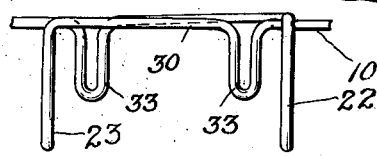
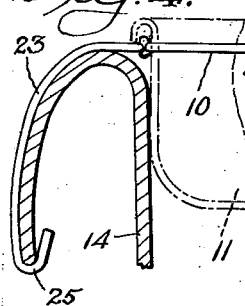
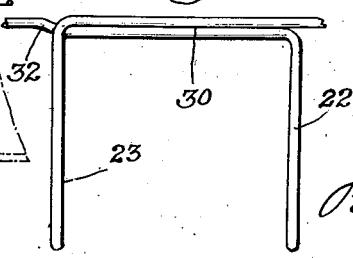
Inventor;
Charles H. Bullock.
BY
Attorneys.

Patented Nov. 9, 1937

2,098,374

UNITED STATES PATENT OFFICE 2,098,374

SINK STRAINER BRACKET

Charles H. Bullock, Evanston, Ill.

Application January 8, 1936, Serial No. 58,086

3 Claims. (Cl. 248—94)

This invention relates to improvements in sink strainer brackets and more particularly concerns a bracket for supporting a kitchen sink strainer along one wall of a sink and spaced above the bottom of the latter.

The most popular form of strainer for use in collecting garbage and refuse in a kitchen sink is of substantially triangular shape adapted to fit in one corner of a sink. The underlying part of the bottom of the sink is not accessible for washing without moving the strainer and will often not be cleansed and thus become stained from fluids dripping from the refuse contents of the strainer. Should the sink drain become clogged or covered and an accumulation of water rise, fine particles of refuse in the strainer will be washed through the customary apertures therein and the remaining refuse will become disagreeably water-logged. When the water in the sink recedes the refuse in the strainer will continue to drain for a long time and create an obnoxious condition. The bottom of the strainer scratches and damages the finish of the sink bottom. Furthermore, the triangular arrangement of the strainer and its proximity to the center of greatest activity in the sink often results in the strainer being tipped over and the contents scattered. The latter condition is aggravated where the strainer is provided with triangular supports, because less force is required to overbalance the strainer.

The principal object of the present invention therefore is to provide a bracket which may be conveniently attached to the side of the sink and which will support the sink strainer in a plane substantially above and out of contact with the bottom of the sink, where the strainer will be above accumulations of water, and drippings may be washed away easily and without moving the assembly.

Another object is to provide a strainer bracket of the foregoing character having a loop for receiving and supporting a sink strainer and including an arrangement for preventing the loop from spreading and for removably connecting the loop to the side of the sink.

Another object resides in the provision of a strainer bracket that may be manufactured simply and quickly at very low cost and which will provide a sturdy and efficient article.

Other objects and advantages will become apparent from the following description taken in connection with the accompanying drawing, in which:

Figure 1 is a diagrammatic perspective view of a practical embodiment of the invention.

Fig. 2 is a fragmentary sectional elevation taken along line 2—2 of Fig. 1.

Fig. 3 is a fragmentary plan view of a slightly modified form of the invention, and shows the bracket located in a back or end corner of a sink.

Fig. 4 is a fragmentary elevational view taken substantially along line 4—4 of Fig. 3 and showing the device as applied in use.

Fig. 5 is a fragmentary side elevational view of a further modified form of the invention.

Figs. 6 and 7 illustrate another modification.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

As shown in the drawing the invention may be embodied in practical form in a bracket comprising a loop 10 defining the upper perimetric dimensions of the body of a strainer 11 which the loop is adapted to surround and support. In practice, I have found that the loop may be formed very inexpensively and quickly of a single strand of wire of appropriate gauge and strength. The strainer 11 may be of the customary, substantially triangular type including angularly related sides 12 and 13 adapted when the strainer is in use to lie, respectively, on parallel lines relative to the convergent walls forming a customary corner 13ª (Fig. 3) of a sink 14. An arcuate side 15 formed on a radius in the angle between the angularly related sides of the strainer ordinarily completes the perimetric outline of the strainer, and a continuous stiffening flange or bead 17 along the upper margin of the sides resists distorting forces against the sides. When the strainer is assembled with the bracket, the bead 17 will rest upon an arcuate section 18 and substantially angularly related sections 19 and 20 of the loop which are projected at substantially right angles from a common center 21 (Fig. 3), substantially corresponding to the sides of the strainer.

Means for connecting the bracket to the side of the sink is arranged herein in such a manner that the strainer may be disposed in the customary corner 13ª of the sink or may be moved into any other position along the side of the sink. For this purpose, the ends of the strand which forms the loop 10 are bent laterally outwardly in spaced parallel relation to form attachment members 22 and 23 extending from one of the sides 19 or 20, depending on whether the bracket is to be applied to a left or right hand sink, to provide bearings interengageable with the side of the sink. Customarily, the upper margin of the side of the sink 14 will be turned outwardly and terminate in a downwardly directed flange or apron 24, and the members 22 and 23 are therefore shaped to rest upon the upper surface of the side of the sink and follow the contour of the apron. At their extremities, each of the members 22 and 23 is provided with a hook 25 for engaging the edge of the apron. In order to permit the right angularly related sides of the bracket to fit relatively closely within the vertical corner 13ª of the sink, the bearing members 22 and 23 are disposed to avoid the fillet or up-curve, indicated at 14ª, which is usually found at the juncture of the top of the sink side and the sink splash-back (Fig. 3). As shown, the bearing member 23 is for this purpose spaced sufficiently from the common center 21.

When the bracket is in place, the loop 10 and the top of the strainer 11 will be maintained in a plane substantially parallel with and approximately on a level with the top of the sink, and the bottom of the strainer will be maintained in a plane substantially above the bottom of the sink. Furthermore, the strainer is supported in such a manner that it cannot tip over. If desired, the position of the assembly may be shifted relative to the side of the sink by sliding the bracket along the apron 24. I have found in practice, moreover, that the bracket, either with the sink strainer in position or removed, forms a convenient drainage support for a colander or food strainer.

The invention also contemplates means for preventing the loop 10 from spreading when unusual pressure is applied to the strainer. As shown herein, this end is attained by permanently closing the loop, substantially the same result accruing from several different arrangements. In Fig. 1, for example, the extreme ends of the wire strand, beyond the hooks 25, are interconnected at 27 in any suitable manner, as by twisting the wire, welding, etc. When embodying this form of connection, the loop may yield slightly to accommodate imperfections in shape or slight differences in the size of the strainer. In other forms of the invention the strand of wire may be interconnected adjacent its ends to close the loop and to confine the same to a predetermined perimeter, the end portions of the strand extending oppositely along the side of the loop a short distance beyond the center of the interconnection and then projecting abruptly therefrom to form the attachment members 22 and 23. In one such form, the ends of the strand may be interengaged by looping the ends about one another as at 28 (Fig. 3) before the attaching hook members 22 and 23 are formed. The loops 28 may be closed by welding or brazing at 29 near the points at which the hook members are bent laterally, thereby avoiding any possibility that the principal loop 10 will tilt on an axis defined by the points of engagement of the connecting loops 28. In another form (Figs. 5 and 7), the ends of the strand may be closed by overlapping as at 30 and permanently connecting the same by welding or the like. One part of the strand may have a slight offset 32 (Fig. 5) adjacent the adjoining portion of the remaining part of the strand in order to maintain the top surface of the loop in a common plane.

When the sink strainer 11 is in place within the loop 10, the side of the strainer may engage the inner face of the side of the sink 14, and much pressure may therefore be applied to the strainer without bending the loop downwardly. If desired, however, the loop 10 may be provided adjacent the hook members 22 and 23 with reinforcing means for contacting the inner face of the side of the sink to prevent substantial downward displacement of the loop when pressure is exerted thereagainst, where the strainer either does not contact the sink or where the bracket is employed as a support for other purposes than for carrying the triangular strainer 11. As shown in Figs. 6 and 7, such means may comprise legs 33, which may be formed by small loops of the wire extending downwardly substantially perpendicular to the plane of the principal loop 10. When the bracket is in place, the legs 33 will engage the sink and maintain the loop in a horizontal plane.

From the foregoing, it will be apparent that I have provided a sink strainer bracket of simple and durable construction that may be manufactured very economically of inexpensive materials and sold at low cost. By forming the hook members of proper predetermined lengths, the bracket is adaptable for use with sinks having aprons of any usual widths. From a decorative standpoint, the bracket may be finished in any desired color by enameling or it may be tinned or otherwise coated and will provide an attractive as well as useful kitchen accessory.

I claim as my invention:

1. A sink strainer bracket comprising, in combination, a wire loop adapted to surround and engage removably the body of a sink strainer, said loop comprising a strand of wire interconnected adjacent its ends to close the loop and to confine the same to a predetermined perimeter, the end portions of said strand extending oppositely along the side of the loop a short distance beyond the center of the interconnection and having parts projecting abruptly therefrom to engage the edge of the sink, said parts being formed to follow the contour of the apron of the sink, and hooks formed on the ends of said parts for engaging the lower margin of said apron to maintain the bracket in position.

2. A bracket for removably receiving and supporting a conventional sink strainer of substantially triangular form in one of the vertical corners of a conventional sink and with its bottom spaced above the bottom of the sink, comprising a body fashioned from a metallic strand and having two angularly related spans which are projected at substantially right angles from a common center and an arcuate span connecting the remote ends of said two spans whereby to receive said strainer perimetrically adjacent the top thereof, and a pair of spaced engagement members extending laterally from one of said two spans and spaced from said common center sufficiently to avoid the usual up-curve at the juncture of the top of the sink side and the sink back so that said two right angularly related sides of the bracket may fit closely within the vertical corner formed at such juncture in the sink.

3. A bracket for removably receiving and supporting a conventional sink strainer of substantially triangular form in one of the vertical corners of a conventional sink and with its bottom spaced above the bottom of the sink, comprising a metallic strand body loop having two angularly related spans which are projected at substantially right angles from a common center and an arcuate span connecting the remote ends of said two spans whereby to encircle and support said strainer, said strand being interconnected adjacent to its ends at an intermediate point of one of said two spans to close and confine the loop to a predetermined perimeter, the end portions of said strand extending oppositely substantially parallel with said one span a short distance beyond the center of the interconnection and having parts projecting from the ends of said portions in spaced relation laterally of said one span to provide bearings engageable with the side of the sink, the bearing part nearest said common center being disposed to permit the right angularly related sides of the bracket to fit closely within said vertical corner of the sink.

CHARLES H. BULLOCK.